(12) United States Patent
Baggenstoss

(10) Patent No.: US 9,470,775 B1
(45) Date of Patent: Oct. 18, 2016

(54) LOCALIZATION OF SHORT DURATION PERIODIC SIGNALS

(71) Applicant: Paul M. Baggenstoss, Newport, RI (US)

(72) Inventor: Paul M. Baggenstoss, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 113 days.

(21) Appl. No.: 14/041,371

(22) Filed: Sep. 30, 2013

(51) Int. Cl.
*G01S 3/80* (2006.01)
*G01S 5/20* (2006.01)

(52) U.S. Cl.
CPC ........................ *G01S 5/20* (2013.01)

(58) Field of Classification Search
CPC ......................................................... G01S 5/20
USPC ........................................................ 367/127
See application file for complete search history.

(56) References Cited

PUBLICATIONS

Zimmer, Walter MX, et al. "Passive acoustic detection of deep-diving beaked whales." The Journal of the Acoustical Society of America 124.5 (2008): 2823-2832.*
Ura, T., et al. "Development of AUV-based system for acoustic tracking of diving sperm whales." Oceans'04. MTTS/IEEE Techno-Ocean'04. vol. 4. IEEE, 2004.*
Baggenstoss, Paul M. "An algorithm for the localization of multiple interfering sperm whales using multi-sensor time difference of arrival." The Journal of the Acoustical Society of America 130.1 (2011): 102-112.*
Freitag, Lee E., and Peter L. Tyack. "Passive acoustic localization of the Atlantic bottlenose dolphin using whistles and echolocation clicks." The Journal of the Acoustical Society of America 93.4 (1993): 2197-2205.*
Marchand, Nathan. "Error distributions of best estimate of position from multiple time difference hyperbolic networks." Aerospace and Navigational Electronics, IEEE Transactions on 2 (1964): 96-100.*
Gervaise, Cedric, et al. "Automatic detection of bioacoustics impulses based on kurtosis under weak signal to noise ratio." Applied Acoustics 71.11 (2010): 1020-1026.*
Van Der Schaar, M., et al. "Neural network-based sperm whale click classification." Journal of the Marine Biological Association of the United Kingdom 87.01 (2007): 35-38.*
Donoho (1995, IEEE) discusses soft thresholding for detecting signals in the presence of relatively large noise components. Tiemann (2001, Oceans)(2002, Sonar)(2003, Oceans)(2006, IEEE), White (2006, Acoustics), Nosal (2007, JASA), Baggenstoss (2008, Can. Acoustics), Marques (2009, JASA), van der Schaar (2009, Algorithms), Baggenstoss (Naval, 2010).*

(Continued)

*Primary Examiner* — James Hulka
*Assistant Examiner* — Jonathan Armstrong
(74) *Attorney, Agent, or Firm* — James M. Kasischke; Michael P. Stanley

(57) ABSTRACT

A method for localizing signals of interest includes initializing characteristics of the signals. Signals are acquired from a sensor array having at least three acoustic sensors. After digitization and conditioning, the signals associated with each sensor are validated by comparison with initialized characteristics. The signals are correlated across sensor groups to obtain time differences of arrival (TDOA). These TDOA are validated and associated with other TDOA from different times. TDOA from different sensor pairs are associated when they share a common sensor. A hyperbola of possible locations is created for each validated TDOA. Summation of the hyperbolas gives an intensity function. The location is identified as the most intense point in the intensity function. The source can be tracked across time as a computer output.

3 Claims, 6 Drawing Sheets

(56) References Cited

PUBLICATIONS

Donoho, David L. "De-noising by soft-thresholding." Information Theory, IEEE Transactions on 41.3 (1995): 613-627.*
Tiemann, Christopher O., Michael B. Porter, and L. Neil Frazer. "Automated model-based localization of marine mammals near Hawaii." Oceans, 2001. MTS/IEEE Conference and Exhibition. vol. 3. IEEE, 2001.*
Tiemann, Christopher O., Michael B. Porter, and John A. Hildebrand. "A Robust Model-Based Algorithm for Localizing Marine Mammal Transients." Impact of Littoral Environmental Variability of Acoustic Predictions and Sonar Performance. Springer Netherlands, 2002. 523-530.*
Tiemann, Christopher O., and Michael B. Porter. "Automated model-based localization of sperm whale clicks." Oceans 2003. Proceedings. vol. 2. IEEE, 2003.*
Tiemann, Christopher O., Stephen W. Martin, and Joseph R. Mobley Jr. "Aerial and acoustic marine mammal detection and localization on Navy ranges." Oceanic Engineering, IEEE Journal of 31.1 (2006): 107-119.*
White, P. R., et al. "Localisation of sperm whales using bottom-mounted sensors." Applied Acoustics 67.11 (2006): 1074-1090.*
Nosal, Eva-Marie, and L. Neil Frazer. "Sperm whale three-dimensional track, swim orientation, beam pattern, and click levels observed on bottom-mounted hydrophonesa)." The Journal of the Acoustical Society of America 122.4 (2007): 1969-1978.*
Baggenstoss, Paul M. "Joint localization and separation of sperm whale clicks." Canadian Acoustics 36.1 (2008): 125-131.*
Marques, Tiago A., et al. "Estimating cetacean population density using fixed passive acoustic sensors: An example with Blainville's beaked whales." The Journal of the Acoustical Society of America 125.4 (2009): 1982-1994.*
Van der Schaar, Mike, Eric Delory, and Michel André. "Classification of Sperm Whale Clicks (*Physeter macrocephalus*) with Gaussian-Kernel-Based Networks." Algorithms 2.3 (2009): 1232-1247.*
Baggenstoss, Paul M. Separation of Sperm Whale Click-Trains for Multipath Rejection and Localization. No. NUWC-NPT-TR-11. Naval Undersea Warfare Center Div Newport RI, 2010.*
Bénard, Frédéric, Hervé Glotin, and Pascale Giraudet. Highly defined whale group tracking by passive acoustic Stochastic Matched Filter. INTECH Open Access Publisher, 2011.*
Laplanche, Christophe. "Bayesian three-dimensional reconstruction of toothed whale trajectories: Passive acoustics assisted with visual and tagging measurements." The Journal of the Acoustical Society of America 132.5 (2012): 3225-3233.*
Thomas, Len, and Tiago A. Marques. "Passive acoustic monitoring for estimating animal density." Acoustics Today 8.3 (2012): 35-44.*
Baggenstoss, Paul M. "Processing advances for localization of beaked whales using time difference of arrival." The Journal of the Acoustical Society of America 133.6 (2013): 4065-4076.*
Baggenstoss, Paul M. "The Jonker-Volgenant algorithm applied to click-train separation." The Journal of the Acoustical Society of America 135.5 (2014): 2485-2488.*
Baggenstoss, Paul M. "A multi-hypothesis tracker for clicking whales." The Journal of the Acoustical Society of America 137.5 (2015): 2552-2562.*

* cited by examiner

LOCALIZATION OF SHORT DURATION PERIODIC SIGNALS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to locating and tracking the source of short duration periodic signals. More particularly it relates to locating and tracking these sources utilizing time-difference-of-arrival (TDOA) validation and association measures.

(2) Description of the Prior Art

In passive sonar, as shown in FIG. 1, it is well known to deploy an array of acoustic sensors 10 from a vessel 12 in a body of water 14. Each acoustic sensor or hydrophone 16 on array 10 is positioned a known distance from another hydrophone 16 along the array line or other such structure. Hydrophones 16 are capable of receiving acoustic signals 18 from sources such as 20. Array 10 is typically joined to a signal processor 22 on board vessel 12. Once such a signal has been received at several hydrophones 16, signal processor 22 utilizes the time the signal 18 arrives at each hydrophone 16 to calculate a time-difference-of-arrival (TDOA) between several pairs of hydrophones. The signal processor 22 has a sound velocity profile from either calculation, a database or a determination giving the speed of sound in the body of water 14, and separation between the hydrophones 16 is also known. Using the known distances, the sound velocity profile and the TDOAs from the array, the signal processor can utilize hyperbolic calculations to determine the location of source 20.

Source 20 can be a variety of sources, such as vessels, pingers, marine mammals or the like. Marine mammals and other biological sources often make short duration periodic signals such as clicks. It is common to locate whales by measuring the time difference for the same click arriving at two spaced hydrophones.

There are several deficiencies with the current state of the art. First, many false TDOA measurements are created with TDOA estimates that are found using correlation. When data from two hydrophones are correlated, the noise that is independently received at each sensor does not correlate well and produces very little or no output. However, when a common signal is present at the two hydrophones, it will cause a correlation peak at the TDOA estimate. When the signal is weak, it is difficult to separate the valid TDOA measurements from fluctuations caused by noise or false peaks spaced from the true peak by the period of the repeating click sequence.

Another issue with the current state of the art arises when more than one source is present with each source having a similar signal. This can occur when the sources are whales in a pod. In this case, a set of hyperbolic solutions will be created for each source and many false intersections are created when the hyperbolic solutions of one source intersects the solutions of another source. It is impossible to know that these intersections are false unless additional information is made available. One way to resolve these ambiguities is to only accept intersections of hyperbolic solutions from hydrophone pairs that share one hydrophone (referred to as hydrophone triples). This results in a fixed relationship between the TDOA measurements that can be checked for consistency.

The problem with the hydrophone triple method is that it does not lend itself well to soft decisions, in other words, whether the TDOAs are related or not related. Granted, it could be adapted to a soft measure simply by measuring how well the fixed relationship holds. However, to get a meaningful measure of association, it is necessary to compare the full set of click arrivals that went into making the TDOA estimate.

As can be seen, there is a need for improved methods for detection, TDOA determination and TDOA association for localization of sources such as marine mammals and other short duration periodic signal sources.

SUMMARY OF THE INVENTION

Accordingly, it is an object of the present invention to provide a method for locating short duration periodic signal sources.

It is a further object to locate such sources in three dimensions.

Another object is the ability to distinguish one signal source from another in the same environment.

It is yet another object to track signal sources from one time to a next.

Accordingly, there is provided a method for localizing and tracking a short duration periodic signal source utilizing a computer. The method includes initializing signal characteristics of signals of interest and acquiring signals from a sensor array having at least three acoustic sensors. The signals are digitized and conditioned based on initialized signal characteristics. The conditioned signals are validated for each sensor by comparison with initialized signal characteristics. The validated conditioned signal associated with one sensor are correlated with the validated conditioned signal associated with another sensor for each sensor pair in the sensor array to obtain time differences of arrival for each sensor pair. These time differences of arrival are validated for each sensor pair. Time differences of arrival from different times from the same sensor pairs are associated with each other, and time differences of arrival from different sensor pairs are associated with each other when the time differences of arrival share a common sensor. Hyperbolas of possible source locations are created for each validated time difference of arrival. These hyperbolas are summed to obtain an intensity function. The location of the signal of interest can be found at a time as the position in the intensity function having the greatest intensity. A source can be tracked across time by utilizing the identified location and associated validated time differences of arrival from different times. The identified location and track can be provided as computer output.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 2:
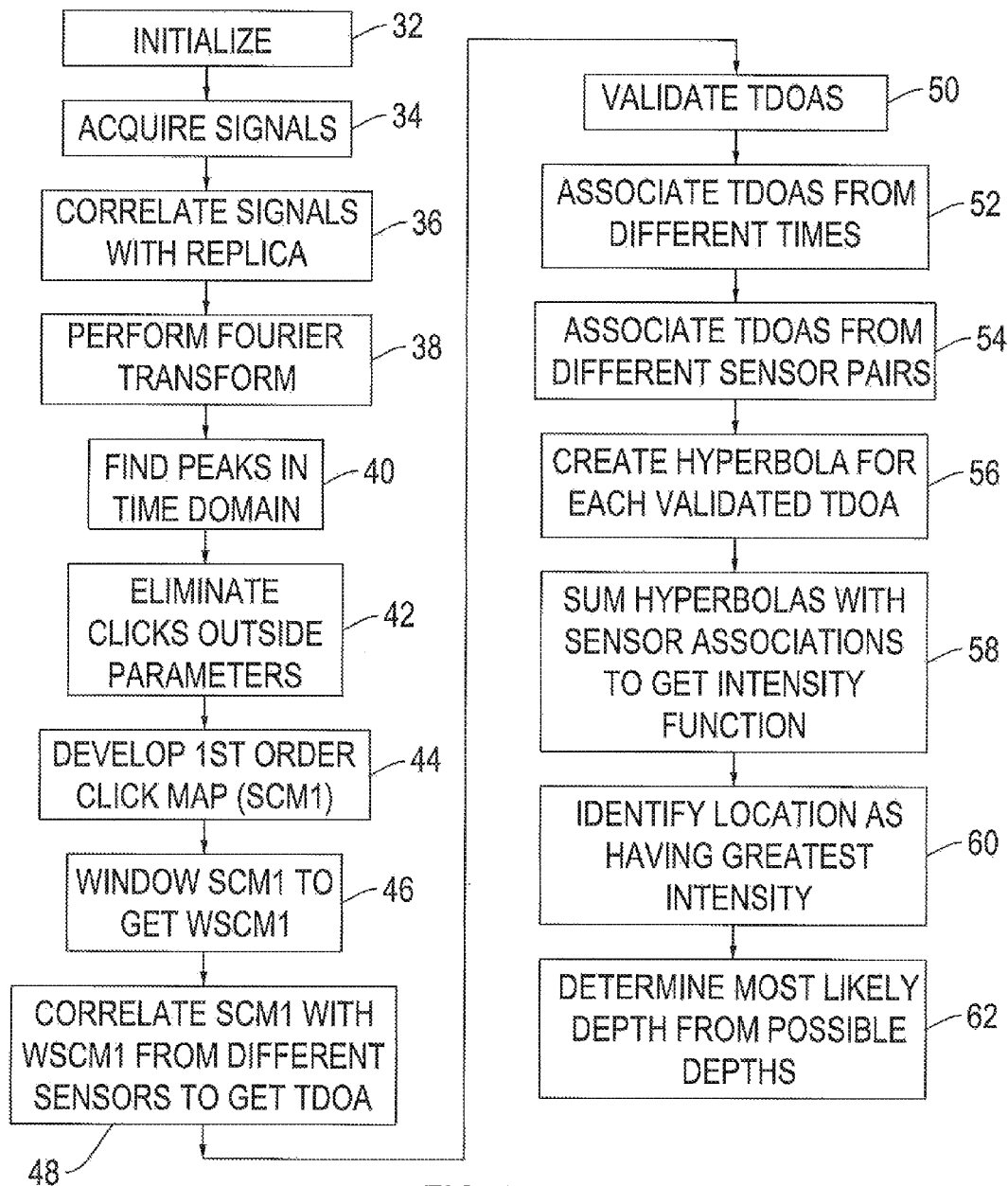
FIG. 2 is flowchart giving an overview of the method of the current invention.

Referring now to FIG. 2, there is shown a flowchart 30 giving an overview of the current procedure. Details of each step in the method will be provided following this overview. In step 32, the method is initialized by developing known information for use in the method. This includes a generic replica of the signal of interest, a range of frequencies for the signal of interest, and a threshold time used to distinguish reflected signals from source signals. The method also uses a computer model trained from experimental and known data to identify valid data and invalid data. This computer model is developed before using the current method to localize signal sources.

Figure 1:
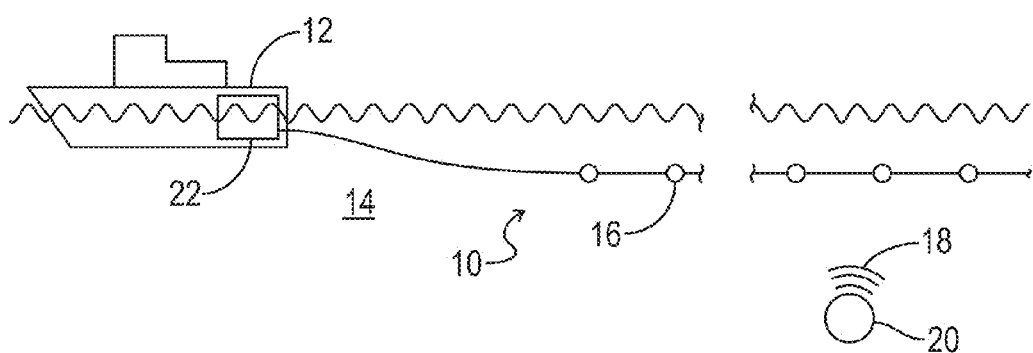
FIG. 1 is a diagram showing the basic problem and signal collection methodology as in the prior art.
Figure 3:
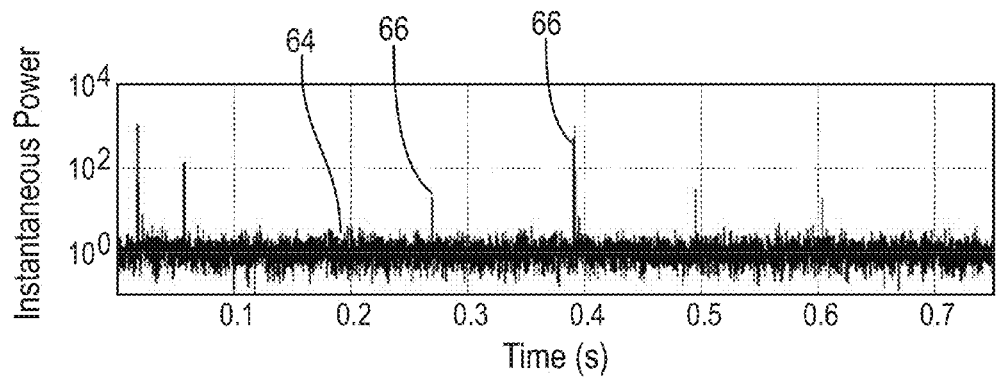
FIG. 3 is a graph of the raw sensor output of power density over time.

In step 34, signals are acquired from an array of hydrophones having at least three hydrophones as described with reference to FIG. 1. The signals are digitized and processed separately. A typical input signal in the time domain is given in FIG. 3. Each signal is correlated in step 36 with the replica developed in step 32. This correlation reduces signals from sources other than the source of interest and is known in the prior art. Each correlated signal is transformed into a frequency domain signal utilizing a Fourier transform in step 38. In step 40, peaks are found in the time domain. Peaks not meeting previously developed parameters concerning frequency and timing are eliminated in step 42. A first order smoothed click map (SCM1) is developed for each signal in step 44. This SCM1 is time windowed in step 46 to create a windowed first order smoothed click map (WSCM1). In step 48, the SCM1 from one hydrophone is correlated with the WSCM1 from a second hydrophone. An initial time-difference-of-arrival (TDOA) can be given by a peak from this correlation.

In step 50, the initial TDOAs are examined to determine if these initial TDOAs are valid. This is performed by calculating a second order smoothed click map (SCM2) and determining if the clicks occur with an expected inter-click interval established in step 32. Another validation test is performed by analyzing the autocorrelation function of the SCM2. The trained computer model from step 32 can be used to establish this validity from these measures as described below. On completion of this step, invalid TDOAs are removed from processing. In step 52, TDOAs from different time segments are associated with each other for tracking a source across time segments. TDOAs from different sensor pairs incorporating one common sensor can be associated with one another in step 54. This step produces an association measure that can be used to further modify the analysis. The associated TDOAs are used to create hyperbolas indicating the source location in step 56. Different sensor pairs give different hyperbolas. These created hyperbolas are modified by an association measure calculated in step 54 and summed in step 58 to get an intensity function. The location of the source is identified as the location with the highest intensity value in step 60.

This process is further described as follows. Data was acquired as in step 34 at a sample rate of 96 kHz. After replica correlation, the instantaneous power is shown FIG. 3. The base level signal is indicated at 64. Higher level signals are given at 66. These periodic signals of interest 66 could be whale calls and the current example was captured from calls from Blainville's beaked whale. The overall signal is processed in step 36 by developing a matched filter derived from calls from Blainville's beaked whale using distributed bottom-mounted hydrophones. A replica waveform was obtained by starting with a single, high signal to noise ratio (SNR) whale click, then determining the peak time of the correlator output response for a training set of several hundred clicks. Each click was time-delayed to align to a data window so that the clicks from all training samples were time-aligned. These were then averaged to obtain the new reference click. After three repetitions, it was found that the replica didn't change significantly.

Utilizing the prior art technique of correlation with the replica was conducted utilizing the following equation:

$$y_t = \sum_{i=0}^{N-1} r_i x_{t+i} \tag{1}$$

where $x_t$ is the input time series from the sensor;
$r_i$ is the replica waveform;
N is the number of terms in the replica; and
$y_t$ is the signal after correlation.

After correlation with the replica, the peaks in the signal are more distinct. The signal to noise ratio is increased by a factor of 3 (+4.7 dB) using the sample beaked whale clicks.

After replica correlation, the Fourier transform of step 38 was calculated. In this step the time series was processed by a Hanning-weighted, seventy-five percent overlapped short time Fourier transform (spectrogram) with a transform size of 24. This produced a 0.0625 millisecond (msec) time resolution. Each Fourier transform bin was normalized separately by a time domain median-based background power estimator. To obtain total power, a frequency-weighted power summing across frequency was performed, selecting only the frequency bands in which the beaked whale energy lies (14-40 kHz). These frequency bands were selected for experimental data in the initialization step, step 32. This produced a power time series with 0.0625 msec resolution that was searched for local maxima above a threshold to identify candidate clicks. A fine click time location was then found by parabolic interpolation of the power time series. This is step 40 of FIG. 2.

In order to remove clicks outside known parameters, step 42, a click center frequency was obtained by finding the power weighted mean frequency of the click energy from the spectrograph at the detected time, $$f_c = \frac{\sum_k |X_k|^2 f_k}{\sum_k |X_k|^2}. \qquad (2)$$

Any clicks that had mean frequencies less than 20 kHz were eliminated in view of an initial determination that the signal of interest was above this threshold. Also, spurious peaks that occurred due to ringing or energy instability that typically occur directly after a loud click were eliminated by searching for much louder clicks within 2.5 msec of the click. This range of times can be determined in the initialization step by knowledge of environmental conditions such as depth.

After elimination of spurious clicks, the method proceeds to step 44. Traditionally, TDOA is determined by producing an amplitude-versus-time description (amplitude time series) of each hydrophone, then correlating the amplitude time-series from two nearby hydrophones. If the clicks from a given whale are present in each amplitude series, then there will be a correlation peak at the corresponding time-delay. It is useful to correlate in such a way that the value of the correlator peak is an indication of the number of clicks that associate or correlate and not a function of click amplitude. To do this, amplitude information is eliminated by forming a synthetic time-series of impulses at the times of the detected clicks. This is called a "click-map". This method further processes the click map by implementing time-domain smoothing in order to allow time uncertainty to be incorporated into the correlation process. The resulting click map is referenced as a first-order smoothed click-map (SCM1) since it is derived from the detections of a single hydrophone.

A first-order smoothed click-map (SCM1) of length T was created from click time locations $t_n$ and amplitudes $a_n$. The time window T was 12 seconds. A synthetic sample rate of $f_s=3$ kHz was chosen, producing a synthetic time series of N=36,000 samples. The ideal synthetic time series was constructed in the frequency domain as $$X_k = c \sum_n e^{\frac{-j2\pi k t_n f_s}{N}} W_k. \qquad (3)$$

The first term in the summand is the Fourier transform of an ideal impulse with time delay $t_n$. The last term, $W_k$ is a time-smoothing term implemented as frequency domain shading. The method used a frequency-domain Hanning function of total width N/4 frequency bins which dropped to zero at k=N/8 on the positive side and k=−N/8 on the negative side. In the time-domain, this has the effect of a smoothing function, producing Gaussian-like "pulse" at each click location of width about 16 samples. The constant c is given by $$c = \frac{1}{\sqrt{\sum_t w_t^2}} \qquad (4)$$

where $w_t$ are samples of the inverse FFT of the frequency weights $W_k$. This scaling has the desired effect that the correlator output approximates the number of clicks, i.e. it will be exactly 1 for a single click.

Time-windowing is also needed prior to cross-correlation to limit wrap-around (circular correlation) effects. To prevent correlation loss, however, a time-windowed SCM1 from one hydrophone is correlated with a non-time-windowed SCM1 from the other hydrophone. The time-windowed SCM1 is given in the frequency-domain by $$\tilde{X}_k = \sum_n e^{\frac{-(t_n-T/2)^4}{(T/4)^4}} e^{\frac{-j2\pi k t_n f_s}{N}} W_k \qquad (5)$$

The first term is a Gaussian kernel that shapes the data, attenuating energy outside of the center of the time window.

Figure 4:
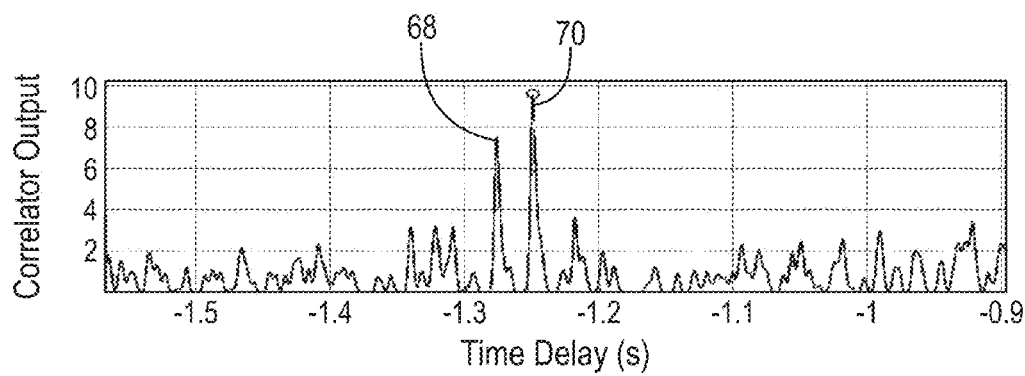
FIG. 4 is a graph of the correlated time delay between two sensor outputs.

The correlation of step 48 in the frequency domain is performed by using the time-windowed SCM1 (WSCM1) of one hydrophone, $\tilde{X}_k^a$ from equation (5), and the non-windowed SCM1 of the other hydrophone, $X_k^b$ from equation (3). For hydrophones a and b, $$c(\tau) = \frac{1}{N} \sum_k \tilde{X}_k^a \overline{X}_k^b e^{\frac{j2\pi k \tau f_s}{N}} \qquad (6)$$

where $\tilde{X}$ is the complex conjugate of X. This produces a correlation result without circular effects, and no overlap loss for time delays in the range $-T/4 \leq \tau \leq T/4$. This gives the signal having the detail shown in FIG. 4. As can be seen, this signal has two prominent peaks as indicated at 68 and 70.

Figure 5:
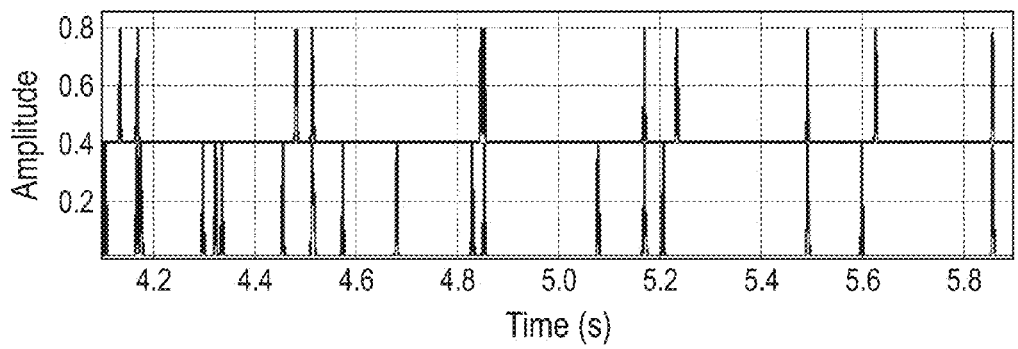
FIG. 5 provides a graph of two first-order smoothed click-maps overlaid to show the relationship of one sensor output to another.
Figure 6:
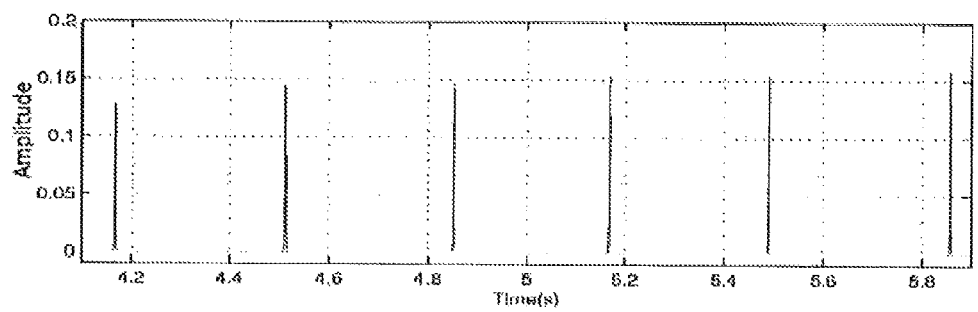
FIG. 6 is a graph showing the multiplication of the two first-order smoothed click maps together to give a second-order smoothed click map.

The data from the correlation result often contains a great number of peaks, but only a very small number are valid. Validity can be shown with reference to FIG. 5. The upper portion shows the SCM1 of a first hydrophone, and the lower portion shows the SCM1 of a second hydrophone. A delay has been applied to the second hydrophone equal to the largest correlation peak from FIG. 4. The first SCM1 has been artificially raised to a resting value of 0.4 for clarity. For many of the peaks in the lower SCM1, there is a corresponding peak in the upper one. FIG. 6 shows a multiplication of the two SCM1s together, which is an estimate of the whale source time-series based on two hydrophones. This is the second-order smoothed click map (SCM2). The SCM2 is always time-referenced to the first hydrophone (the one with no delay applied). The number of clicks roughly corresponds with the correlator output magnitude. FIG. 6 shows one measure of validity because it has an inter-click interval (ICI) of 0.33 seconds. The ICI of the regular foraging clicks of the Blaineville's beaked whale are known in the prior art to be 0.37 seconds on average with 0.1 sec standard deviation.

In order to objectify the validity analysis, the method utilizes initial parameters to identify a set of features of the SCM2. These features are obtained from the auto-correlation function (ACF) and power spectrum (PS) of the source time-series estimate. Date form the smoothed ACF has a ripple at the 0.33 second inter-click interval rate and the power spectrum has a peak near 3 Hz. A change in the ICI can cause the power spectrum to have multiple peaks. Thus, experimentally derived characteristics of a valid SCM2 are that the smoothed auto-correlation function (ACF) r(τ), normalized for r(0)=1, exhibits ripple at time lag equivalent to the ICI, denoted by $T_0$. The peaks in the ACF slowly drop in amplitude as τ increases. Also, the power spectrum (i.e.

the Fourier transform of the autocorrelation function) exhibits a large peak at the frequency $1/T_0$.

These characteristics can be established by calculating the moments of the ACF and saving the value of the power spectrum at $1/T_0$. The p-th moment of the ACF is given by:

$$\mu_p = \int_{\tau=0}^{T/4} r(\tau)\tau^p \, d\tau. \qquad (7)$$

Moments $\mu_1$, $\mu_2$, and $\mu_3$ are used to calculated features mu1, mu2 and mu3 as follows:

$$mu1 = \mu_1, \; mu2 = \frac{\sqrt{\mu_2}}{\mu_1}, \; mu3 = \frac{\sqrt[3]{\mu_3}}{\mu_1} \qquad (8)$$

A further feature identified as specmax can be calculated based on the maximum power spectrum value, $$\arg\max_f \int_{\tau=0}^{T/4} \cos(2\pi f \tau) r(\tau) \, d\tau. \qquad (9)$$

In a preferred embodiment, these features are combined in a feature vector:

$$z=[\text{specmax},mu1,mu2,mu3] \qquad (10)$$

Feature vector z is used to train a Gaussian mixture model utilizing experimental data in order to develop a likelihood ratio $$L=\log p(z|H_1)-\log p(z|H_0) \qquad (11)$$

where $H_1$ and $H_0$ are the valid and invalid assumptions. The advantage of this method is that it doesn't assume Gaussian distributions. Correlation peaks with L below an experimentally determined threshold are discarded.

Figure 7:
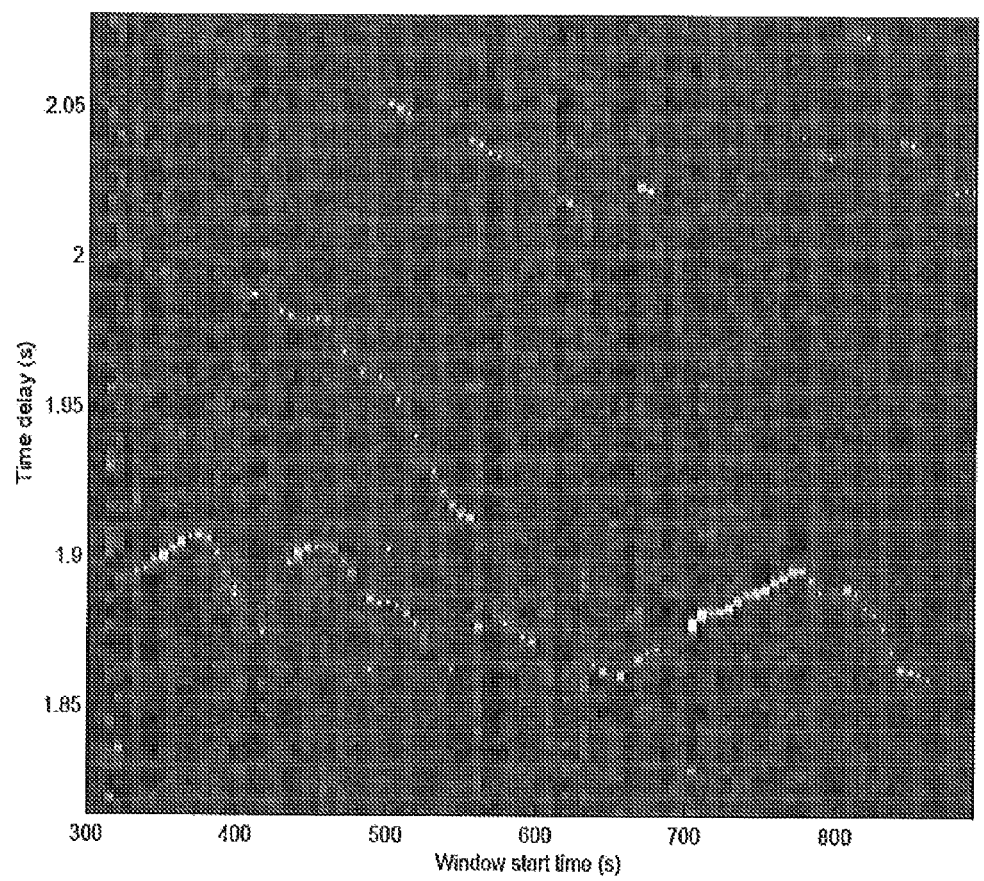
FIG. 7 is a graph show cross sensor correlation (correlogram) allowing visual association of sources.

In step 52 of FIG. 2, TDOAs can be associated across different time periods. In the prior art this was done by correlating the output of two sensors over time to give a graph such as that shown in FIG. 7. In FIG. 7, higher intensity tracks are generally interpreted to be the same correlated signals over time. For measurements at sequential times on a given single hydrophone pair, the time-windows used in the correlation will be highly overlapped. In a test of beaked whale data a 12-second window with 2 second update period was used, resulting in 10 seconds of overlap. If the TDOA measurements made at consecutive times are from the same whale, the TDOA values will be nearly the same, but will differ slightly due to the movement of the whale and the fact that new source clicks have moved into the processing window. But, if there is a high degree of overlap between the processing windows, many of the same clicks will be present in both time updates. So, if the source time-series is estimated, click times can be directly compared after taking into account the shift in the processing window.

To obtain a measure of click matching, peaks shown in the SCM2 were used to locate source clicks then the times of the source clicks from sequential time windows were compared. Let $n_p$ and $n_q$ be the number of source clicks detected at time windows p and q. Let $$\beta = \sum_{k=1}^{n_p} \sum_{l=1}^{n_q} \exp\left\{\frac{-(t_p(k) - t_q(l))^2}{2\sigma_t^2}\right\} \qquad (12)$$

where $t_p(k)$ is the k-th source click time from window p and $\sigma_t$ is a time tolerance value (standard deviation). This is effectively a measurement of the number of matching click times because if the errors of matching click pairs are nearly zero, and are high for invalid click pairs, the exponential term will be nearly 1.0 for valid and zero for invalid click pairs.

Only sequential measurements with $\beta$ above a threshold are assumed to associate. It has been determined empirically that good thresholds are that $\beta$ should be greater than 7 and the TDOA difference should be less than 3 ms (at 2 second update). Only those TDOA measurements with at least one sequential association were accepted. This means that to accept a TDOA measurement, it must be detected in at least two consecutive time updates.

According to step 54 of FIG. 2, TDOAs obtained from different pairs of hydrophones must be analyzed to determine if they are related. This is accomplished by click-matching, in essentially the same way that consecutive TDOA measurements were associated in step 52. The second order smoothed click map (SCM2) is obtained for two TDOA measurements made using two different hydrophone pairs, but with a shared hydrophone. If times are referenced to the common hydrophone, the click times should match.

Thus, the system has acquired data from at least three hydrophones. All of the hydrophone pairs at approximately the same time have been correlated to obtain a collection of TDOA measurements. Using this data, $\alpha_{l,m}$ is calculated as an association measure that relates TDOA measurements l and m. If TDOA measurements l and m do not share exactly one hydrophone, then $\alpha_{l,m}=0$. Otherwise, $$\alpha_{l,m} = \sum_{i=1}^{n_l} \sum_{j=1}^{n_m} \exp\left\{\frac{-(t_l(i) - t_m(j))^2}{2\sigma_t^2}\right\} \qquad (13)$$

where $t_l(i)$ is the i-th click time for TDOA l and $t_m(j)$ is the jth click time for TDOA m, referenced to the hydrophone that is common between TDOA l and m. This measure is effectively a count of the number of matching click times if we assume that the exponential term is near one for valid associations and near 0 for invalid ones.

Localization of the signals is carried out in steps 56, 58 and 60 utilizing hyperbolic positioning with an intensity function. Hyperbolic positioning is a well known technique for localizing a signal emitter having an unknown position. If the depth z is assumed known, the locus of points representing the possible locations of the source are given by a hyperbola in the x-y plane. Let i(m) and j(m) be the two hydrophone indexes used to measure TDOA m. Let $T_i(m)$ (x, y, z) be the model propagation time from position x, y, z to hydrophone i(m). Then the model propagation time difference $d_m$ is $$d_m(x,y,z)=T_{i(m)}(x,y,z)-T_{j(m)}(x,y,z) \qquad (14)$$

The TDOA measurement, $\tau_m$ should, ideally, be equal to $d_m(x,y,z)$. The solution of the equation:

$$d_m(x,y,z)=\tau_m \qquad (15)$$

is a surface of points that intersects a constant-depth plane on a hyperbola. Thus, for every TDOA measurement that has been suitably vetted, the corresponding hyperbola is drawn on the x, y plane using an assumed depth z. This is given as step 56 of FIG. 2. Rather than drawing hyperbolas as thin lines, these hyperbolas can be modified to allow for time-delay error by assigning a "likelihood" or "probability" to a position on a grid based on the difference between the model time delay (assuming that position) and the measured time delay (for the given hyperbolas). This is known in the art. For an assumed depth z, and a particular TDOA measurement m, an intensity is assigned to each point x, y according to a Gaussian function $$I_m(x, y, z) = e^{\frac{-(d_m(x,y,z)-\tau_m)^2}{2\sigma_t^2}}, \quad (16)$$

where $\sigma_t^2$ is a time delay variance. When all of the hyperbolas are summed an intensity function is obtained:

$$I(x, y, z) = \sum_m e^{\frac{-(d_m(x,y,z)-\tau_m)^2}{2\sigma_t^2}}. \quad (17)$$

Figure 8:
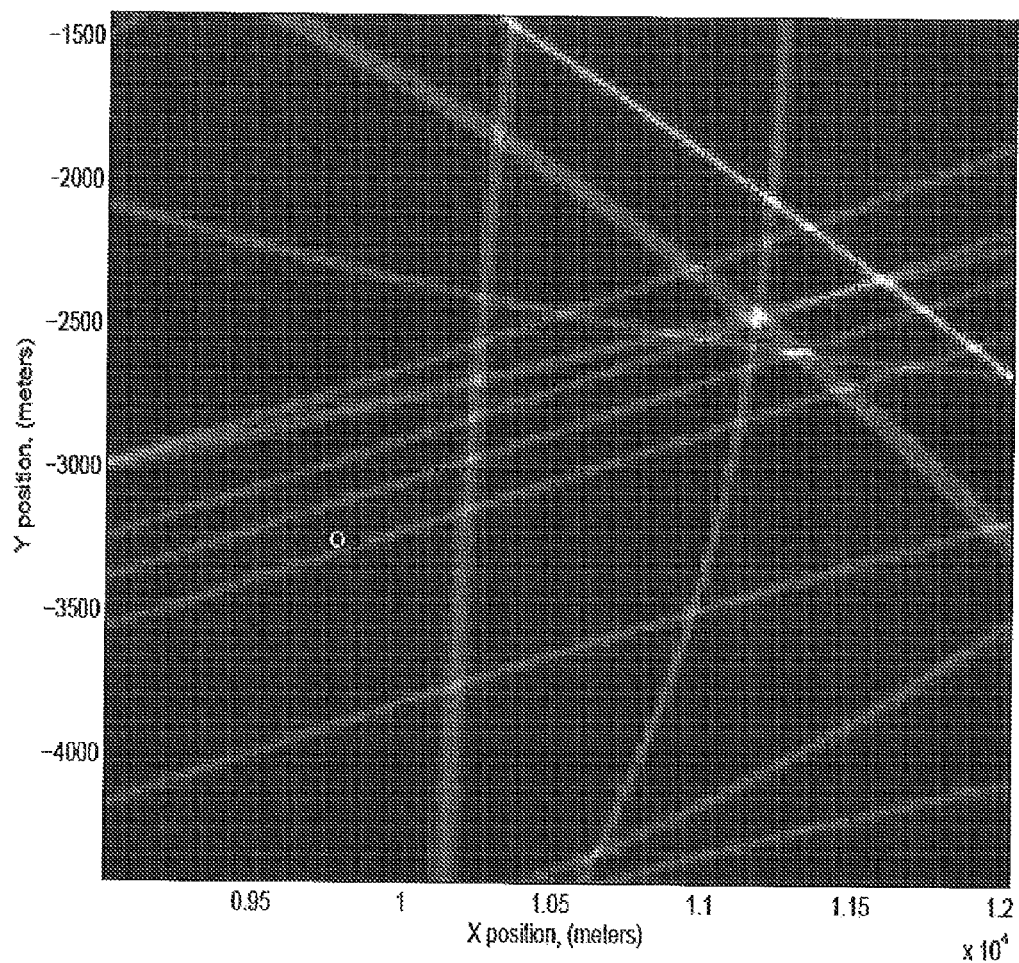
FIG. 8 shows an initial TDOA localization surface.

An example of this is shown in FIG. 8. This is the usual prior art means for localizing objects. Notice that the hyperbolas add together regardless of whether they are truly associated. At the correct locations, it is assumed that there will be more and consistent contributions, so correct localizations will be accentuated.

The current invention teaches improving on the localization given by FIG. 8 and equation (17) by using the TDOA association measure, $\alpha_{l,m}$. In order to improve the localization, the current method sums all pairs of TDOA measurements, adding up the product of the spatially smoothed hyperbolas weighted by the soft association measure $\alpha_{l,m}$. This gives $$I(x, y, z) = \sum_{l,m} \alpha_{l,m} e^{\frac{-(d_l(x,y,z)-\tau_l)^2}{2\sigma_t^2}} e^{\frac{-(d_m(x,y,z)-\tau_m)^2}{2\sigma_t^2}}. \quad (18)$$

This can be efficiently computed by pre-computing $I_m(x,y,z)$, the summand in equation (17) for index m.

Figure 9:
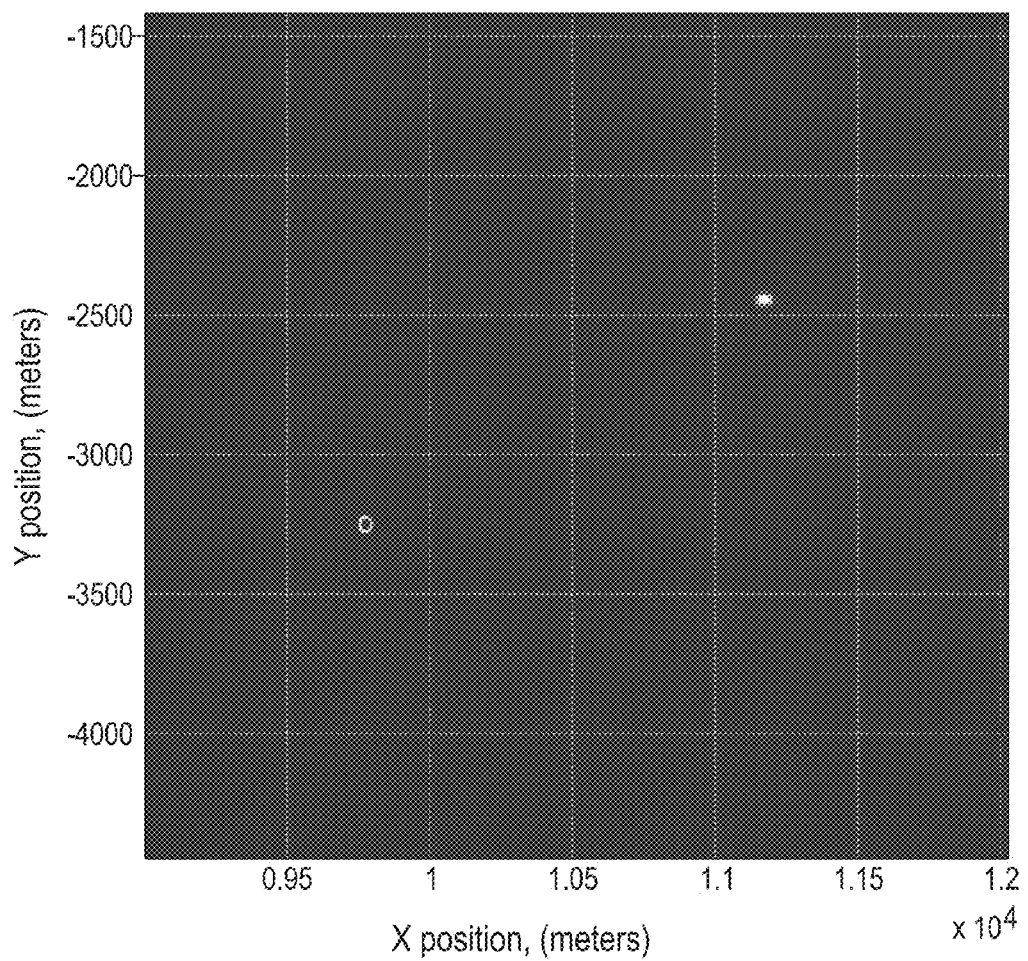
FIG. 9 shows a TDOA localization surface using a "soft" association measure, using the same data that created the initial TDOA localization surface of FIG. 9.

The result of this procedure is shown in FIG. 9 for the same data as FIG. 8. Only one point in the plane can be seen. This is the localized point given by equation (18). This can be provided to a user or another automated system in order to guide the user toward or away from the source. If this process is repeated, stepping forward by 2 seconds at a time, a sense of the movement of the source is developed.

In step 62 of FIG. 2, a depth for the source can be established. A three dimensional volume can be obtained by repeating the procedure at a set of depths. In order to maximize this process, a three dimensional peak peaking algorithm can be used; however, this results in many local maxima. These can be used as candidate position solutions that can be associated utilizing the TDOA association measure, $\alpha_{l,m}$. One way of performing this association is by utilizing the technique taught in Baggenstoss, P. M., "An algorithm for the localization of multiple interfering sperm whales using multi-sensor time difference of arrival", 130 Journal of the Acoustical Society of America 2011 (hereinafter "Baggenstoss 2011"), which is incorporated by reference herein. In this technique, candidate solutions compete for the TDOA measurements. Weights, $w_{k,m}$, are established that relate the TDOA to the solution by approximating the probability that measurement m belongs to solution k. These weights are iteratively updated as the position estimates are refined.

In order to incorporate the inter-TDOA association measure, $\alpha_{l,m}$, the following steps are utilized. M is the number of TDOA measurements and K is the number of candidate solutions. The association weights are initialized to the flat condition:

$$w_{k,m} = \frac{1}{K}, \quad 1 \le k \le K, \ 1 \le m \le M. \quad (19)$$

All TDOA measurements are used by each candidate position k in the position update equation. The effect of each TDOA measurement in the solution update, however, is weighted by $w_{k,m}$ and many of the weights go to zero or nearly zero. Thus, a particular candidate solution can "own" a set of TDOA estimates, effectively preventing other solutions from using it.

In the current method the TDOA weights, $w_{k,m}$, are augmented by another weighting. First, a weighting, $\beta_m$, is defined that depends only on the time delay error, as follows:

$$\beta_m = e^{\frac{-(d_m(x,y,z)-\tau_m)^2}{\sigma_t^2/4}}. \quad (20)$$

where the factor "4" is empirically determined. The TDOA association measure, $\alpha_{l,m}$, is incorporated by defining the weight $\gamma_{k,m}$:

$$\gamma_{k,m} = \sum_l \left(1 - e^{-\alpha_{m,l}/4}\right)\beta_l\beta_m,. \quad (21)$$

where the factor "4" is also empirically determined. The combined weight:

$$\tilde{w}_{k,m} = w_{k,m}\gamma_{k,m} \quad (22)$$

is used in place of $w_{k,m}$, in the positional update equation for solution k. When combined with the teachings of Baggenstoss 2011, this allows determination of the depth by utilizing associated TDOA measurements.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for localizing environmental signals of interest utilizing a computer comprising the steps of:

initializing signal characteristics of signals of interest;
acquiring signals from a sensor array having at least three acoustic sensors;
digitizing said acquired signals;
conditioning said digitized signals based on initialized signal characteristics;
validating conditioned signals associated with each sensor by comparison with initialized signal characteristics;
correlating the validated conditioned signal associated with one sensor with the validated conditioned signal associated with another sensor for each sensor pair in the sensor array to obtain time differences of arrival for each sensor pair, wherein the step of correlating the validated conditioned signal associated with one sensor with the validated conditioned signal associated with another sensor comprises the steps of:
developing a first order click map for the validated conditioned signal associated with one sensor;
developing a first order click map for the validated conditioned signal associated with another sensor;
windowing the first order click map for each signal to obtain a windowed first order click map for one sensor and a windowed first order click map for another sensor; and
correlating said first order click map from one sensor with a windowed first order click map from another sensor to obtain an initial time difference of arrival for the sensor pair;
validating the time differences of arrival for each sensor pair;
associating validated time differences of arrival from different times from the same sensor pairs;
associating validated time differences of arrival from different sensor pairs when the time differences of arrival share a common sensor;
creating a hyperbola of possible source locations for each validated time difference of arrival;
summing hyperbolas created from associated validated time differences of arrival from different sensor pairs to obtain an intensity function;
identifying location at a time as a position in the intensity function having the greatest intensity;
tracking a source across time by utilizing the identified location and associated validated time differences of arrival from different times; and
providing said identified location and track as computer output.

2. The method of claim 1 wherein the step of validating the time differences of arrival for each sensor pair comprises:
providing a threshold time for signal repetition in said step of initializing;
calculating a second order smoothed click map by multiplying the first order click map for the validated conditioned signal associated with one sensor by the first order click map for the validated conditioned signal associated with another sensor;
validating the time difference of arrival when the second order smoothed click map gives a peak separation measure within the threshold time for signal repetition.

3. The method of claim 1 wherein the step of validating the time difference of arrival comprises:
providing a trained model of signals of interest in said step of initializing, said trained model being capable of analyzing features comprising signal repetition rate, auto-correlation characteristics, and power spectrum characteristics;
calculating a second order smoothed click map by multiplying the first order click map for the validated conditioned signal associated with one sensor by the first order click map for the validated conditioned signal associated with another sensor;
calculating an autocorrelation function for the conditioned digitized signals;
calculating a power spectrum for the conditioned digitized signals; and
validating the time difference of arrival when the trained model of signals of interest indicates that the second order smoothed click map, autocorrelation function and power spectrum for the signals in the sensor pair are in accordance with the features of the signal of interest.

* * * * *